United States Patent
Chen et al.

(10) Patent No.: US 7,196,626 B2
(45) Date of Patent: Mar. 27, 2007

(54) RADIO FREQUENCY IDENTIFICATION RFID TAG

(75) Inventors: Shih-Zong Chen, Yuanli Township, Miaoli County (TW); Jian-Jhih Ciou, Gueishan Township, Taoyuan County (TW); Liang-Cin Wang, Kaohsiung (TW)

(73) Assignee: Wha Yu Industrial Co., Ltd., Hsin Chu (TW)

( * ) Notice: Subject to any disclaimer, the term of this patent is extended or adjusted under 35 U.S.C. 154(b) by 140 days.

(21) Appl. No.: 11/044,311

(22) Filed: Jan. 28, 2005

(65) Prior Publication Data

US 2006/0181422 A1    Aug. 17, 2006

(51) Int. Cl.
*G08B 13/14* (2006.01)

(52) U.S. Cl. .................. 340/572.7; 343/700 MS; 343/846; 343/848; 235/492

(58) Field of Classification Search ............ None
See application file for complete search history.

(56) References Cited

U.S. PATENT DOCUMENTS

| | | | | |
|---|---|---|---|---|
| 4,151,531 A | * | 4/1979 | Kaloi | 343/700 MS |
| 5,528,222 A | * | 6/1996 | Moskowitz et al. | 340/572.7 |
| 6,329,958 B1 | * | 12/2001 | McLean et al. | 373/787 |
| 6,437,985 B1 | * | 8/2002 | Blanc et al. | 361/749 |
| 6,466,131 B1 | * | 10/2002 | Tuttle et al. | 340/572.7 |
| 6,664,926 B1 | * | 12/2003 | Zinanti et al. | 343/700 MS |
| 6,801,169 B1 | * | 10/2004 | Chang et al. | 343/700 MS |
| 6,867,736 B2 | * | 3/2005 | Faraone et al. | 343/700 MS |
| 6,914,562 B2 | * | 7/2005 | Forster | 343/700 MS |
| 6,937,193 B2 | * | 8/2005 | Hendler et al. | 343/700 MS |
| 7,002,475 B2 | * | 2/2006 | Brady et al. | 340/572.7 |
| 7,098,852 B2 | * | 8/2006 | Ikuta et al. | 343/700 MS |
| 2005/0200539 A1 | * | 9/2005 | Forster et al. | 343/749 |

* cited by examiner

*Primary Examiner*—Benjamin C. Lee
(74) *Attorney, Agent, or Firm*—Egbert Law Offices

(57) ABSTRACT

The RFID TAG includes a conducting antenna affixed to the surface of the substrate. And, wireless telecommunication IC is electrically linked to antenna. The antenna is provided with a conductor plane and a conductor pressing section, such that wireless telecommunication IC can be electrically linked between conductor plane and conductor pressing section. The area of conductor plane of antenna is bigger than that of conductor pressing section, whereas linear pins are mounted at both sides of wireless telecommunication IC, which is electrically linked to the conductor plane and conductor pressing section by a metal welding, thereby achieving a miniaturized RFID TAG with ease of manufacturing and cost effectiveness.

2 Claims, 4 Drawing Sheets

RADIO FREQUENCY IDENTIFICATION RFID TAG

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a RFID tag, and more particularly to a RFID tag designed with an innovative structure and spatial configuration for its antenna and wireless telecommunication IC.

BACKGROUND OF THE INVENTION

Generally, a Radio Frequency Identification (RFID) tag refers to the components including wireless telecommunication IC and antenna with an size less than 2 cm, by which data can be read or written in with the help of specific reader/writer. Thanks to the features of RFID that permit to search for information, such as IC and properties via telecommunication mode, the business operators can provide cost-effective logistics services according to accurate flow direction of materials. Therefore, this tag is gradually replacing traditional bar codes and magnetic cards.

An operating mode, which combines "individuals", "goods" with "environment" via RFID-based hyperlink, is currently applied to some commercial fields, such as logistics systems, production management and log control, etc. The common customers will be benefited from the development of this know-how, coupling with a wider range of commercial applications and increased amount of goods fitted with RFID. For this purpose, the following problems shall be resolved for RFID:

1. Price of RFID TAG:

The price of RFID TAG includes manufacturing cost of IC chip, antenna and package. Today, there is a trend that cost reduction can be realized by miniaturized RFID TAG. The size of UHF (860 MHZ~960 MHZ) RFID TAG antenna is closely related to the wavelength. For a resonant antenna structure, the wavelength of UHF 915 MHZ frequency is approx. 32.8 cm. The length of common dipole antenna is about one-half of the wavelength. In the case of UHF 915 MHZ, a length of about 16.5 cm shall be required. The size of antenna for UHF RFID tag is still a little bigger, thus leading to an increased cost of RFID tag, and making it difficult to meet the expectation of market due to failure of miniature.

2. Miniature of RFID TAG:

In addition to a higher cost, the oversize of RFID TAG will make it difficult to be adhered to a smaller product.

3. Connection of IC Chip and Antenna:

The wireless telecommunication IC for traditional RFID is placed onto conducting film substrate by a microchip, and then applied by adhesive to form a modular wireless telecommunication IC of antenna, namely, wireless telecommunication IC is electrically linked to antenna by compression bonding of conducting resin. Next, a protective film is affixed onto the surface to form a required RFID tag. However, this manufacturing process requires specific instruments and high-duty manufacturing modules for cost effectiveness. So, a small amount of diversified RFID tags will generate disadvantages such as difficult manufacturing process and increasing cost.

Thus, to overcome the aforementioned problems of the prior art RFID structural design, it would be an advancement in the art to provide an innovative structure that can solve the existing disadvantages for a higher efficiency.

To this end, the inventors have provided the present invention of practicability after deliberate design and evaluation based on years of experience in the production, development and design of related products.

BRIEF SUMMARY OF THE INVENTION

1. In the present invention, the area of conductor plane 201 is designed to be bigger than that of conductor pressing section 202, thus yielding an image effect for antenna. This can reduce significantly the size of antenna, but also enhance greatly the radiation capability to match the required frequency range. Also, thanks to the plane layout of conductor plane 201 that assists in reducing input impedance of antenna in a more efficient and easier way than conventional antenna (dipole antenna), while optimizing the impedance match of antenna 20. Therefore, it is possible to provide a miniaturized RFID TAG, and reduce the production and test cost of antenna for a higher economical efficiency.

2. Based on the special embedding structure of wireless telecommunication IC 30, the present invention can offer a thin-profile wireless telecommunication IC 30 with much simplified manufacturing process. Also, thanks to the structure of two lead frames 31 32 fitted with convex linear pins 311 321, electrical connection between wireless telecommunication IC 30 and antenna 20 can be achieved by means of welding. For RFID tags with insufficient mass production, the assembly and manufacturing process of wireless telecommunication IC 30 and antenna are simpler and flexible. Therefore, no high-duty manufacturing process and equipments shall be required for this purpose, thereby helping to minimize the manufacturing cost of RFID tags and promote the overall economical efficiency.

The aforementioned discussions involve the structural configuration of antenna, which shall be suited for use with other wireless telecommunication IC not included in the present invention. The structural configuration of wireless telecommunication IC 30 in the present invention is also suited for use with other antennas not included in this paper. All such variations or changes shall be embraced within the scope of the following claims.

The performance, cost or other design factors of above-specified antenna 20 shall be optimized to match the profile, such as the preferred embodiment of antennas 20 as shown in FIG. 5.

The above is a detailed description of the technical features of the present invention based on a typical preferred embodiment. However, it should be appreciated that the present invention is capable of a variety of embodiments and various modifications by those skilled in the art, and all such variations or changes shall be embraced within the scope of the following claims.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
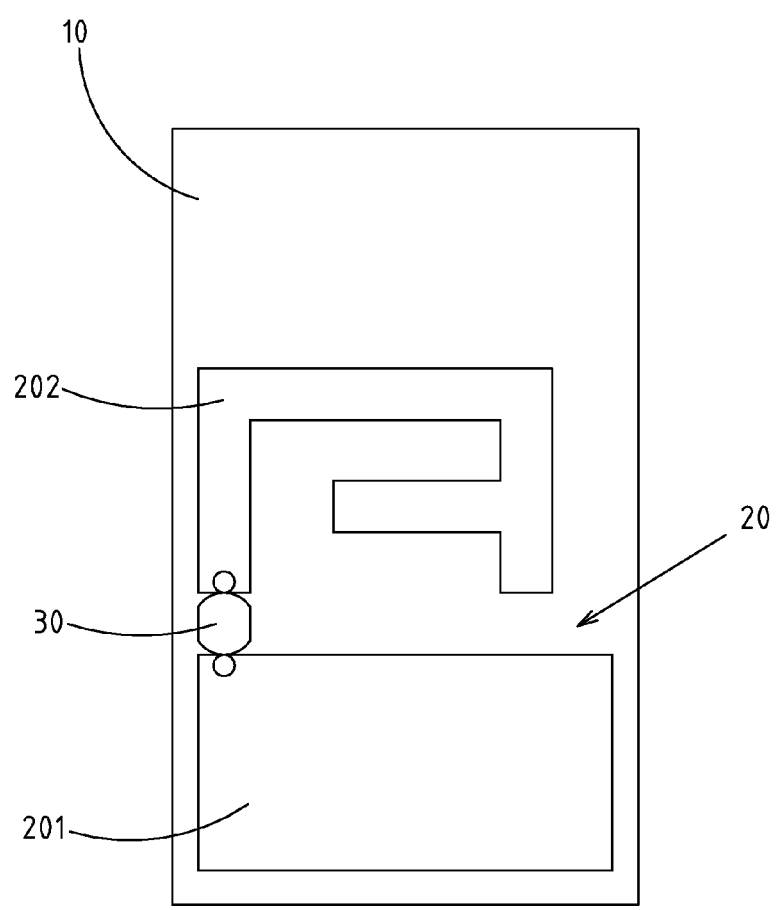
FIG. 1 shows an assembled top plan view of the present invention.
Figure 2:
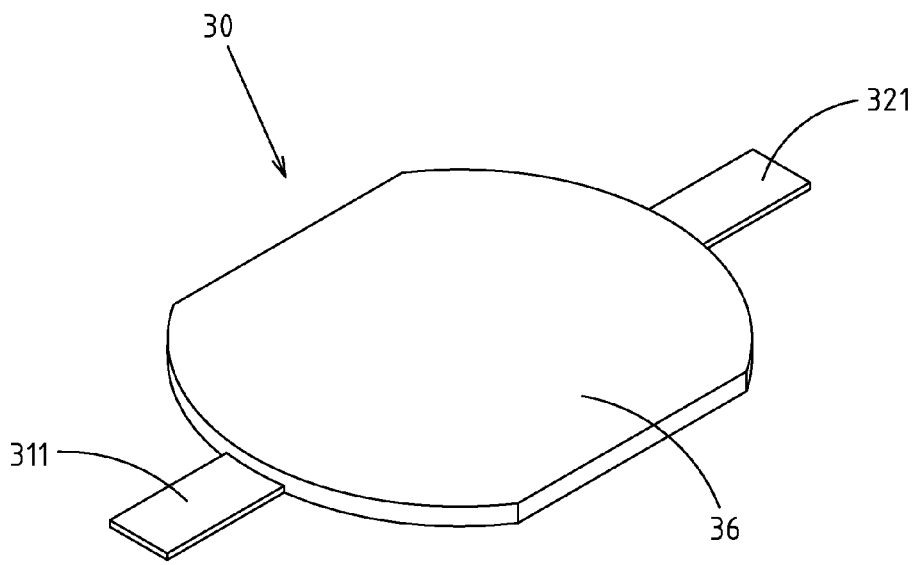
FIG. 2 shows a perspective view of the telecommunication IC from the over view.
Figure 3:
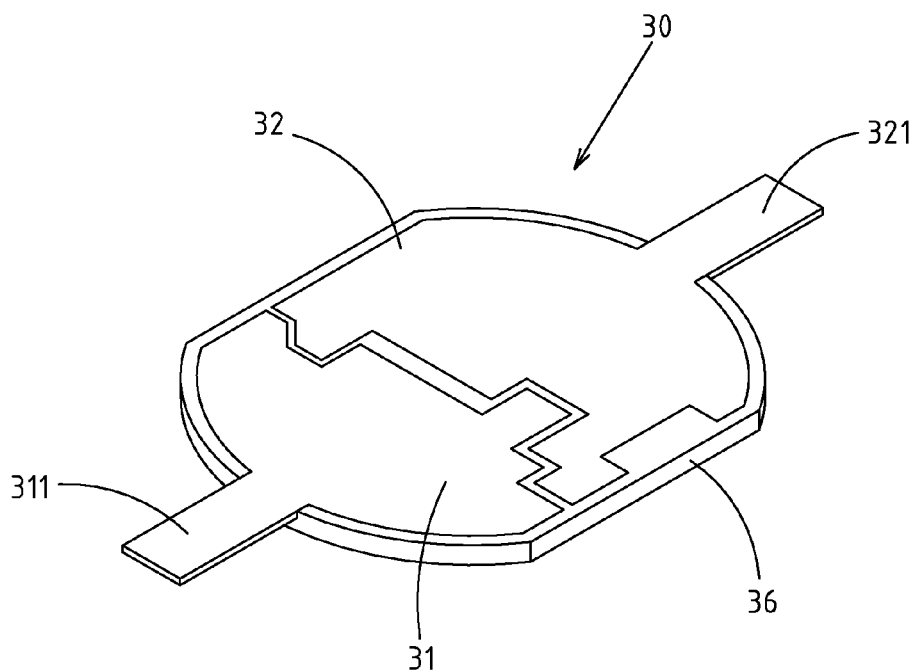
FIG. 3 shows a perspective view of the telecommunication IC.
Figure 4:
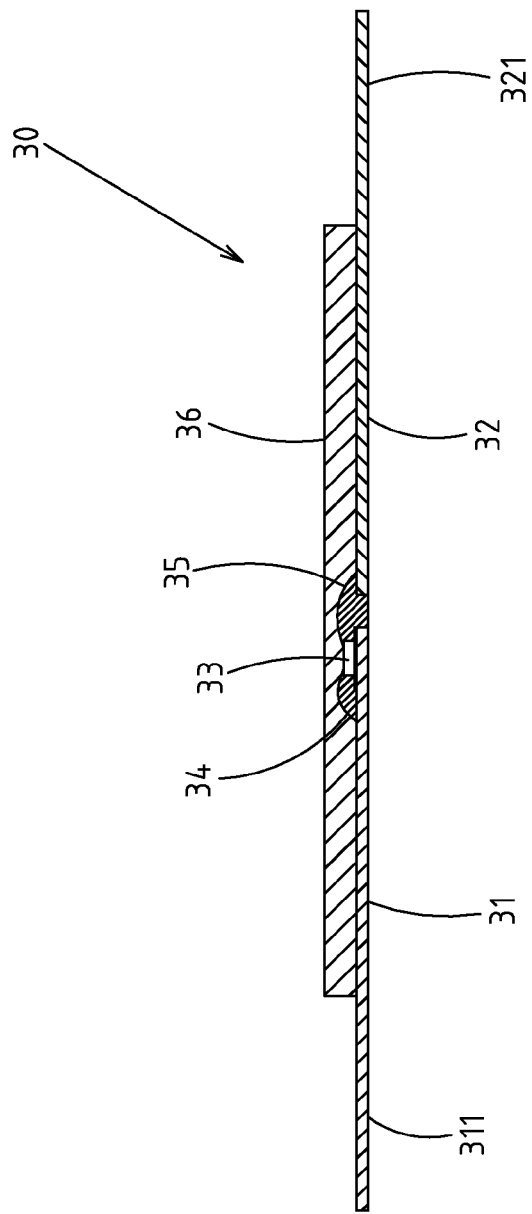
FIG. 4 shows a cross-sectional view of the telecommunication IC.
Figure 5:
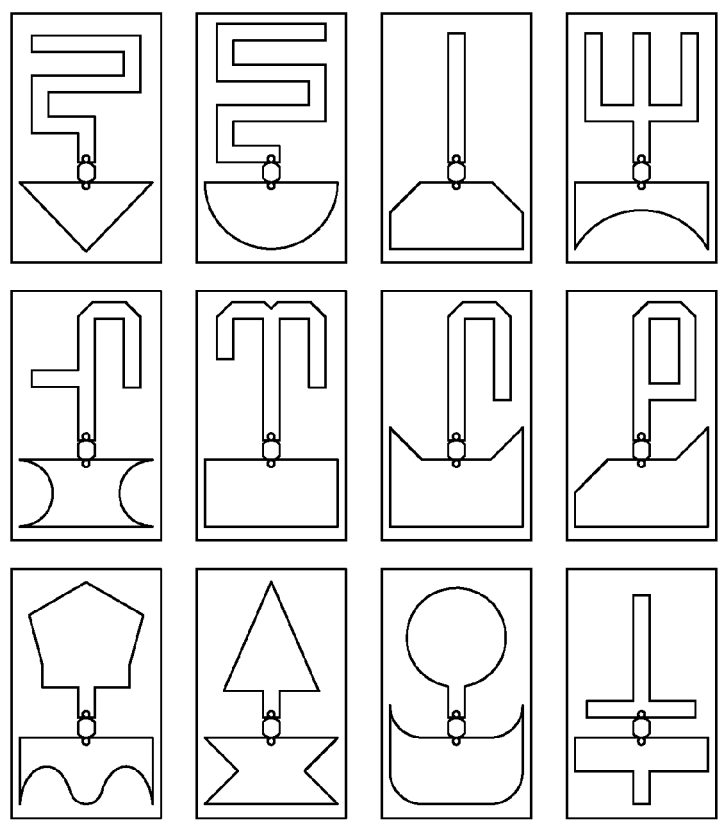
FIG. 5 shows top plan views of the multiple applications of the antenna.

As shown in FIG. 1, there is a RFID tag embodied in the present invention.

The invention includes a substrate 10, which is constructed of flexible materials, such as Polyimide or polyester organic materials, or inflexible ones, such as porcelain, glass and PCB, or resin for processing of PCB, typically as epoxy resin;

There is also an antenna 20m which is adhered to the surface of substrate 10, which is constructed of conducting materials, such as Cu-or Al-inclusive metallic conductor or microwave carbon fiber material. The antenna 20 is provided with a conductor plane 201 and a conductor pressing section 202, of which the latter one serves as a reference unit for tag signal.

The invention further includes a wireless telecommunication IC 30, which is adhered to the surface of substrate 10 and electrically linked between conductor plane 201 and conductor pressing section 202 of antenna 20.

In wireless telecommunication IC 30, there are two parallel lead frames 31 32, which are made of conducting materials with thin-profile configuration.

There is also a chip 33, which is fixed onto the surface of lead frame 31, and fastened onto another lead frame 32. Two metallic wires 34 35 are electrically linked to adjacent lead frames 31 32 from both sides at top of chip 33.

The invention also has a label applicator 36, which is sealed at the surface of two lead frames 31 32 and chip 33 to form a thin profile. The area of conductor plane 201 of antenna 20 is bigger than that of conductor pressing section 202, thus yielding an image effect for antenna. This effect will help to reduce the length, area and input impedance of RFID TAG antenna. At the exterior edge of two lead frames 31 32 of wireless telecommunication IC 30, there are two convex linear pins 311 321, which are electrically linked to conductor plane 201 and conductor pressing section 202 of antenna 20 by means of metal welding.

For a RFID TAG, the area of conductor plane 201 of antenna 20 is bigger than that of conductor pressing section 202, thus yielding an image effect for antenna. This effect will help to reduce the length, area and input impedance of RFID TAG antenna.

We claim:

1. A RFID tag comprising:
a substrate, comprised of flexible materials, including Polyimide or polyester organic materials, or inflexible materials, including porcelain, glass and PCB, or resin for processing of PCB, including epoxy resin or glass fiber;
an antenna, adhered to a surface of the substrate, and comprised of conducting materials, including Cu-or Al-inclusive metallic conductor or microwave carbon fiber material, said antenna further comprising a conductor plane and a conductor pressing section, the pressing section serving as a reference unit for a tag signal; and
a wireless telecommunication IC, adhered to the surface of the substrate and electrically linked between the conductor plane and the conductor pressing section of the antenna, an area of the conductor plane of the antenna is bigger than that of the conductor pressing section, thus yielding an image effect for the antenna, resulting in reduced length, area and input impedance of the antenna.

2. A RFID tag comprising:
a substrate, comprised of flexible materials, including Polyimide or polyester organic materials, or inflexible materials, including porcelain, glass and PCB, or resin for processing of PCB, including epoxy resin or glass fiber;
an antenna, adhered to a surface of the substrate and comprised of conducting materials, including Cu-or Al-inclusive metallic conductor or microwave carbon fiber material, said antenna further comprising a conductor plane and a conductor pressing section, the pressing section serving as a reference unit for a tag signal; and
a wireless telecommunication IC, adhered to a surface of the substrate and electrically linked between the conductor plane and the conductor pressing section of the antenna, said wireless telecommunication IC comprising:
two parallel lead frames, comprised of conducting materials with thin-profile configuration;
a chip, which is fixed onto a surface of a lead frame, and fastened onto another lead frame, two metallic wires being electrically linked to adjacent lead frames from both sides at top of the chip; and
a label applicator, sealed at the surface of the two lead frames and chip to form a thin profile, said label applicator further comprising, at an exterior edge of the two lead frames of the wireless telecommunication IC, two convex linear pins, electrically linked to the conductor plane and the conductor pressing section of the antenna by metal welding;
wherein the area of the conductor plane of said antenna is bigger than that of the conductor pressing section, thus yielding an image effect for the antenna, resulting in reduced length, area and input impedance of said antenna.

* * * * *